United States Patent [19]

Witt

[11] Patent Number: 4,482,675

[45] Date of Patent: Nov. 13, 1984

[54] WATER-SOLUBLE, PRESSURE-SENSITIVE ADHESIVE COMPOSITION, AND PROCESS FOR MAKING SAME

[75] Inventor: Edward Witt, Framingham, Mass.

[73] Assignee: Colgate-Palmolive Company, New York, N.Y.

[21] Appl. No.: 449,025

[22] Filed: Dec. 13, 1982

[51] Int. Cl.³ .................. C08F 20/06; C08F 20/16
[52] U.S. Cl. .................. 525/132; 525/327.4; 525/327.7; 525/327.8; 525/384; 525/385
[58] Field of Search .................. 525/132, 327.4, 327.7, 525/327.8, 384, 385

[56] References Cited

U.S. PATENT DOCUMENTS

| | | | |
|---|---|---|---|
| 2,607,761 | 8/1952 | Seymour | 525/327.4 |
| 2,876,894 | 3/1959 | Dahlquist et al. | 525/227.8 |
| 3,769,254 | 10/1973 | Anderson et al. | 525/327.8 |
| 3,925,328 | 12/1975 | Shibahara et al. | 525/327.8 |
| 4,005,247 | 1/1977 | Graham | 525/327.8 |

Primary Examiner—Allan M. Lieberman
Attorney, Agent, or Firm—Herbert S. Sylvester; Murray M. Grill; Norman Blumenkopf

[57] ABSTRACT

Water-soluble, pressure-sensitive adhesive compositions with effective adhesion, tack, and cohesive strength are provided. The composition comprises acrylate based polymer systems containing carboxylic functionality which are at least partially esterified with an ethoxylate of alkyl phenol or aliphatic alcohol and then at least partially neutralized with alkaline material. The compositions are admirably adapted as coatings for substrates to produce various tape products and for paper substrate. The paper tapes are especially useful for splicing tapes in paper board manufacture process and by virtue of the repulpability of the tape product recycling in such manufacturing process is facilitated.

16 Claims, No Drawings

WATER-SOLUBLE, PRESSURE-SENSITIVE ADHESIVE COMPOSITION, AND PROCESS FOR MAKING SAME

BACKGROUND OF THE INVENTION

1. Field Of The Invention

This invention relates to pressure-sensitive adhesives derived from the copolymerization of addition polymerizable monomer materials, said adhesives being water-soluble or dispersable and particularly adapted for use in preparing tape products requiring effective adhesion and tack properties, yet easily removable and/or repulpable by means of aqueous media.

2. Description Of The Prior Art

The need for water-soluble or dispersable, pressure-sensitive adhesive compositions having effective adhesion and tack properties in a variety of commercial applications is largely selfevident, such need being particularly manifest in the manufacture of paper products, e.g., newspaper-magazine publishing which would significantly benefit from the availability of repulpable splicing tapes for use with automatic splicing equipment. In addition to the aforementioned solubility, adhesion and tack properties, any such adhesive should ideally exhibit shear strength and humidity stability. Other uses for such adhesives include the manufacture of water-removable tape products, such as might be used on housewares, as appliance labels and the like.

Adhesives thus far provided for such use generally fail to provide effective adhesion and tack properties, not to mention cohesive strength and humidity stability, in combination with the requisite solubility and repulpability features. With polymeric adhesive(s), the use of specific monomer(s) for purposes of increasing adhesion and tack is often at the expense of solubility and/or cohesive strength. Conversely, an increase in polymer modules by appropriate monomer(s) selection is often at the expense of tack and adhesion.

Pressure-sensitive adhesives comprising polymers including within their molecular structure alkanol or phenol esters of carboxylic acid groups derived from $\alpha,\beta$-ethylenically unsaturated carboxylic acid anhydrides have been proposed. However, materials of this general type thus far proposed are found to be inadequate for the aforedescribed use.

Water-soluble polymeric partial esters prepared from the copolymerization of maleic anhydride and e.g., vinyl methyl ether, followed by esterification of the polymer product with nonionic material, such as the reaction product of nonyl phenol with 10 moles ethylene oxide are described as detergent stabilizers in, for example, U.S. Pat. No. 3,328,309. In accordance with the present invention, it has been discovered that polymers generally related to those described in the referenced patent serve as valuable precursors for the production of water-soluble or dispersible pressure-sensitive adhesives.

A primary object of the invention is to provide water-soluble or dispersible pressure-sensitive adhesives wherein the foregoing and related disadvantages are eliminated or at least substantially mitigated.

Another object of the invention is to provide such adhesives having the properties of repulpability, tack and adhesion, and thus useful in the manufacture of appliance labels and the like.

A further object of the invention is to provide in preferred embodiments thereof, such adhesives further favorably characterized in possessing effective cohesive strength, shear, humidity stability and the like, and thus particularly useful in the manufacture of repulpable splicing tapes for use with automatic splicing equipment.

Yet another object of the invention is to provide a process for the preparation of such adhesives.

Other objects and advantages of the invention will become more apparent hereinafter, as the description proceeds.

The foregoing and related objects are attained in accordance with the invention which in its broader aspects provides a water-soluble, pressure-sensitive adhesive composition comprising the neutralized (and particularly the alkali metal salts) reaction product of a $C_6$–$C_{18}$ alkyl phenol or $C_6$–$C_{18}$ alkanol containing about 4 to 30 moles combined ethylene oxide with a copolymer obtained by the polymerization of a monomer composition comprising by weight: from about 35 to 85% of acrylate monomer of the formula $CH_2=C(R)—COOR_1$ wherein R is hydrogen or $C_1$–$C_4$ alkyl, and $R_1$ is $C_1$–$C_{14}$ alkyl; with the proviso that at least 60% is $C_4$ or greater in the case of acrylates, $C_6$ or greater in the case of $C_1$ to $C_4$ substituted (i.e. for R) acrylates; from about 8 to 30% of an $\alpha,\beta$-ethylenically unsaturated di-carboxylic acid anhydride and from about 8 to 30% of monomer selected from vinyl esters, vinyl ethers, vinyl halides, styrene, $C_1$–$C_4$ alkyl styrenes, lower ($C_1$ to $C_6$) alkyl methacrylates and $\alpha$-olefins, the weight ratio of acrylate to anhydride being from about 1.5:1 to 8:1, the amount of said alkyl phenol or alkanol being sufficient to provide an alkyl phenol or alkanol:anhydride mole ratio of about 0.3 to 0.8 and at least about 0.7 when said acrylate:anhydride weight ratio is below about 4.

In a further aspect, the invention provides a process for preparing such adhesive comprising contacting the monomer(s) in bulk or as a solution of said monomer composition with an effective amount of polymerization catalyst at a temperature of from about 65°–85° C. for a time sufficient to enable at least substantial conversion of monomer to polymer, thereafter contacting said polymer with sufficient of the described alkanol or alkyl phenol esterifying agent to provide an alkyl phenol or alkanol:anhydride mole ratio of about 0.3 to 0.8 and at least about 0.7 when said acrylate:anhydride weight ratio is below about 4, said 65°–85° C. temperature being maintained throughout the esterification reaction and thereafter neutralizing said esterified polymer with an alkaline material at a temperature from about 0° C. to 100° C. preferably 15°–40° C. more preferably at about 20° to 30° C., mostly preferably at about 25° C. to provide a degree of neutralization from about 0.5 to 1.0 and sufficient to provide a water-soluble polymer product.

In accordance with particularly preferred embodiments, contacting of monomer and catalyst is effected incrementally by dividing the catalyst into separate solution portions, e.g., a first catalyst solution comprising about 70–80% of the total weight of catalyst solution to be charged and a second, more concentrated, catalyst solution. When so proceeding, about 40 to 60% of the total monomer to be charged is initially contacted with about 40 to 60% of the first catalyst solution in the reaction medium. The remaining monomer and balance of the first catalyst solution are later added simultaneously, followed by addition of the entire quantity of the second catalyst solution, all additions being made according to a predetermined time sequence.

In accordance with the invention, it is found that both esterification and neutralization of the base polymer, e.g., acrylate/acetate/anhydride, are essential in order to provide an effective polymeric adhesive. Thus, the neutralized but non-esterified base polymer, although water-soluble, possesses no creep (shear adhesion), tack, or adhesive properties. Conversely, the esterified but non-neutralized base polymer is neither water-soluble nor dispersible, and is totally lacking in cohesive strength within the limits tested. Moreover, probe tack is virtually non-existent unless inordinately high mole ratios of nonionic:anhydride are used.

Esterification with the nonionic materials to be described in detail increases the adhesion and tack of the base polymer, this being attributable, most probably, to the plasticizing effect of the polyethoxyl moiety present in the nonionic material. However, excessive amounts of nonionic tend to impair cohesive strength; thus with reference to a base polymer of butyl acrylate-vinyl acetate-maleic anhydride (78-10-12 on a parts by weight basis) optimum properties re tack, adhesion and cohesive strength are obtained with the use of about 50 php (parts per hundred parts of polymer) of nonionic. In the case of Igepal CO-630 nonionic, a preferred esterifying agent herein comprising the reaction product of nonyl phenol with 9 moles ethylene oxide, this corresponds to a mole ratio of nonionic to the maleic anhydride included in the base polymer of about 0.67. Should the neutralization step be omitted, it is found that increasing the degree of esterification decreases the cohesive strength.

Neutralization of the esterified base polymer with alkali improves the cohesive strength, water solubility, adhesion and tack of the polymer. All such properties are found to increase with increasing values of degree of neutralization. Thus, for the 78/10/12 butyl acrylate/-vinyl acetate/maleic anhydride base polymer, hereinafter also designated BuA/VA/MAH, complete water solubility thereof is obtained when treated with 40 to 60 php of the C0-630 nonionic and neutralizing to a degree greater than 0.75. With 30 php of the same nonionic, the esterified polymer is water-dispersable at complete neutralization. Thus, polymer solubility is apparently a function of both the ethoxyl concentration and ionized carboxyl functionality. When fully neutralized with NaOH, all polymeric adhesives in accordance with the invention pass the repulpability test.

Cohesive strength of the instant compositions, as evaluated by 160° F. creep measurements (applied stress of 500 g/in$^2$), is found to increase with increased degree of neutralization.

Acrylate monomers useful herein for preparing the base copolymer have the formula

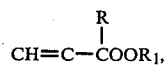

wherein R is hydrogen or $C_1$-$C_4$ alkyl and $R_1$ is alkyl of 1 to 14 and preferably 2 to 6 carbons. Examples include methyl acrylate, 2-ethylhexylacrylate (2EHA) and most preferably, butyl acrylate (BuA). MMA, though normally considered to be a high Tg type of monomer capable of increasing the modules and thus cohesive strength of the product, copolymer is not as effective as the VA. Use of MMA is in addition to, rather than in lieu of BuA. When compared to the BuA-containing base polymer, the 2EHA system exhibits lower cohesive strength as indicated by the 160° F., creep (shear) test as well as lower adhesion-tack values.

The acrylate monomer should comprise from about 35 to 85 by weight of the monomer mixture and in forming the base polymer product with a range of about 40 to 80% being preferred. Generally, as the proportion of acrylate is increased, the amount of nonionic required for esterification, expressed as a mole ratio on the basis of anhdyride, is decreased, as will be demonstrated in the examples. The weight ratio of acrylate monomer to anhydride comonomer should be from about 1.5:1 to 8:1, and preferably 4:1 to 7:1. In the most preferred embodiments, such ratio approximates 6.5:1.

α,β-ethylenically unsaturated di-carboxylic anhydride monomers useful herein for preparing the base copolymer include maleic, citraconic and itaconic anhydrides with maleic anhydride (MAH) comprising the preferred species. The anhydride constitutes from about 8 to 30% and preferably 8 to 20% by weight of the monomer composition. As will be demonstrated in the examples, decreasing the anhydride proportion provides a more favorably characterized copolymer product.

The remaining component of the comonomer composition is selected from vinyl esters, e.g., vinyl acetate, vinyl propionate, vinyl butyrate, etc; styrene, alkyl styrenes such as α-methyl styrene; lower alkyl methacrylates, e.g., methyl methacrylate; vinyl halides, e.g., vinyl chloride; vinyl alkyl (preferably $C_1$ to $C_4$) ethers, e.g., vinyl methyl ether, vinyl ethyl ether, etc., and αolefins, e.g. ethylene and propylene. Preferred species include vinyl acetate, styrene and MMA, with vinyl acetate being particularly preferred. This monomer component constitutes about 8 to 30% and preferably about 10-25% by weight of the comonomer mixture. In particularly preferred compositions, e.g., including vinyl acetate, such monomer comprises about 10% of the monomer mixture.

The base polymer as made available for esterification with nonionic has a viscosity of from about 500 to 1500 and preferably 800 to 1200 ps as measured on a Brookfield viscometer RVT #4 @50 rpm.* Polymerization as described herein proceeds to at least about 93% conversion. Specific examples of base interpolymers useful herein include the following:

BuA/VA/MAH (78-10-12)
BuA/VA/MAH (70-10-20)
BuA/VA/MAH (65-15-20)
BuA/VA/MAH (65-25-10)
BuA/VA/MAH (60-10-30)
BuA/VA/MAH (45-25-30)
BuA/Sty/MAH (78-10-12)
BuA/MMA/MAH (78-10-12)
2EHA/VA/MAH (78-10-12)

Nonionic materials useful herein for esterification of the base polymer generally comprise a $C_6$-$C_{18}$ and preferably $C_8$ to $C_{18}$ alkyl phenol or $C_8$-$C_{18}$ alkanol containing about 4 to 50 and preferably 6 to 30 moles combined ethylene oxide. Specific materials include without necessary limitation Igepal CO-630 comprising nonyl phenol condensed with about 9.5 moles ethylene oxide and commercially supplied by GAF; Igepal CO-530 comprising nonyl phenol condensed with 6 moles ethylene oxide, Igepal CO-430 comprising nonyl phenol condensed with 4 moles ethylene oxide; Igepal CO-880 comprising nonyl phenol condensed with 30 moles ethylene oxide, Tergitol 15-S-5 supplied by Union Carbide comprising linear $C_{11}$–$C_{15}$ alcohol condensed with 5 moles ethylene oxide and Triton X-45 supplied by Rohm & Haas comprising octyl phenol condensed with 5 moles ethylene oxide. Esterification is generally effected at elevated temperature, e.g., 65°–85° C. by adding the nonionic to the reaction medium containing the pre-formed polymer as previously described. The amount of nonionic used is from about 30–60 and preferably 45–55 php corresponding to a mole ratio expressed on the basis of anhydride in the base polymer of about 0.3 to 0.8 and at least about 0.7 when the acrylate:anhydride weight ratio in the polymer is below about 4.

*about 50% polymer solution in ethyl acetate/toluene (80:25) at 23° C.

The post esterified base polymer is thereafter neutralized with an alkali to provide a degree of neutralization of from about 0.5 to 1.0. The use of organic amines such as dimethyl and trimethyl amine provides a water-insoluble product which fails the repulpability test and has little or no cohesive strength. These results are obtained despite stoichiometric neutralization of the esterified polymer. Preferred are alkali metal hydroxides and carbonates. Although in certain embodiments an adhesive polymer product is obtained having severely reduced cohesive strength, such materials are nevertheless useful in a variety of applications, since they are water-soluble or dispersible and possess satisfactory adhesion-tack properties. According to particularly preferred embodiments, e.g., esterification of a BuA/VA/MAH base polymer with the Igepal CO-630 nonionic material in amounts providing a mole ratio on the basis of MAH of about 0.67 followed by stoichiometric neutralization with NaOH, the adhesion, tack and cohesive properties are optimized in the water-soluble adhesive product.

The base copolymers of the following examples are prepared as follows, specific reference being now made to the Bua/VA/MAH polymer species.

Monomer and catalyst solution having the following composition are provided:

| Monomer Solution | Parts | Catalyst Solution 1 | Parts | Catalyst Solution 2 | Parts |
|---|---|---|---|---|---|
| BuA | 78 | Ethyl Acetate | 17.9 | Ethyl Acetate | 5.0 |
| VA | 10 | AIBN* | 0.5 | AIBN* | 0.3 |
| MAH | 12 | | | | |
| Ethyl Acetate | 57.1 | | | | |
| Toluene | 25 | | | | |

*Azobisisobutyronitrile

Approximately 50% of the monomer and catalyst 1 solutions are added to the reactor, purged with nitrogen and heated to 70°, maintaining the reaction temperature at 70°–80° C. for ½ hour. The balance of the monomer and catalyst solution 1 are then added over a 1-to 1½-hour period. The temperature is maintained for an additional 1½ hours, with catalyst solution 2 containing 0.3 phm (parts per hundred parts total monomer) AIBN injected ½ hour into the hold period. The polyethoxylated alcohol is then added, maintaining the temperature for an additional 3 hours. The temperature is then reduced to 23° C. and the reaction product stoichiometrically neutralized (degree of neutralization=1.0) with 25% aqueous NaOH solution.

Samples are evaluated by first pigmenting the base polymer solution with 0.15 php Sandoz "Actosol Blue RLS" and then casting a 1.3. mil (dry) layer, onto a repulpable bleached kraft, one-sided release paper. Physical properties including water solubility, and paper repulpability are then determined.

Repulpability is determined by adhering a 1×11-inch strip of the tape product onto a 8⅛×11-inch sheet of Hammermill "Fore Xeroxcopy" paper. This sheet along with two other sheets are then cut into 1-inch-square pieces. Thus, the tape product is dispersed with approximately 13 gms of paper stock. The paper is added to a "Waring Blender" containing 600 mls of 40°–45° C. water. The blender is then run at "liquefy" speed for 20 seconds, rinsed down with water, and re-run for an additional 20 seconds.

Approximately 170 mls of the resulting pulp dispersion is then diluted to 250 mls with water and vacuum filtered, using a large Buchner funnel, fitted with a fine mesh screen. The resulting paper "cake" is then compressed and examined for any blue coloration. The absence of blue color is taken as evidence of repulpability.

Water solubility is determined by placing a tape strip into water and observing the resulting solution. In most instances, repulpability and water solubility results are found to be equivalent. Only when the polymer is water dispersible would there be a discrepancy between the two tests, i.e., the tape can be repulpable yet the adhesive not completely water soluble.

The polymerization is found to proceed to 94.1% conversion by the end of the 1½ hour hold period. Continued heating in the absence of the polyethoxylated alcohol for an additional 3 hours results in a conversion of essentially 100%. The Brookfield viscosity RVT #4 @50 rpm is determined to be 920 cps.

Esterification of the polymer product is effected with Igepal Co-630 at a concentration range of up to 60 php corresponding to an Igepal/MAH mole ratio range of up to about 0.8.

The partially esterified polymer product is then neutralized with NaOH to provide the degree of neutralization indicated in the examples.

In the examples, all parts are by weight unless otherwise indicated.

EXAMPLES 1–15

The polymers of these examples are prepared in the aforedescribed manner; the precursor monomer composition and amount of nonionic, the latter expressed as a mole ratio on a maleic anhydride (MAH) basis, are indicated in Table 1. In each case, stoichiometric neutralization of the partially esterified (with Igepal CO-630) BuA/VA/MAH copolymer is effected with NaOH providing a degree of neutralization (D.N.) of 1.0. All polymer samples are repulpable as well as water soluble, save for the example 2 species which is in any event readily water dispersible. Each of the polymer samples is evaluated for adhesion to steel, probe tack and cohesive strength (creep), with the following results:

TABLE I

| EX No. | Mole ratio CO-630/ MAH | Adhesion Steel (OZ/in) | Probe Tack (g) | 160° Creep (hours) | Wgt. Ratio BuA/MAH |
|---|---|---|---|---|---|
| | | BuA-VA-MAH (78-10-12) | | | 6.5:1 |
| 1. | .355 | 35 | 34 | >100 | |
| 2. | .399 | 38 | 29 | " | |
| 3. | .532 | 57 | 106 | " | |
| 4. | .666 | 92 | 389 | " | |
| 5. | .798 | 26 | 150 | .02 | |

TABLE I-continued

| EX No. | Mole ratio CO-630/ MAH | Adhesion Steel (OZ/in) | Probe Tack (g) | 160° Creep (hours) | Wgt. Ratio BuA/MAH |
|---|---|---|---|---|---|
| | | BuA-VA-MAH (70-10-20) | | | 3.5:1 |
| 6. | .334 | 1 | 25 | 0 | |
| 7. | .490 | 1 | 77 | 0 | |
| | | BuA-Va-MAH (65-15-20) | | | 3.5:1 |
| 8. | .716 | 62 | 228 | .02 | |
| 9. | .716 | 58 | 216 | .1 | |
| | | BuA-VA-MAH (65-25-10) | | | 6.5:1 |
| 10. | .398 | 36 | 34 | >100 | |
| | | BuA-VA-MAH (60-10-30) | | | 2:1 |
| 11. | .159 | 1 | 0 | 0 | |
| 12. | .353 | 1 | 16 | 0 | |
| | | BuA-VA-MAH (45-25-30) | | | 1.5:1 |
| 13. | .133 | 0 | 0 | 0 | |
| 14. | .353 | 1 | 0 | 0 | |
| 15. | .797 | 53 | 161 | >100 | |

Within the limits of the foregoing data, the following general conclusions are tenably suggested with reference to the adhesion, tack and creep properties evaluated: Increasing the weight ratio of acrylate to MAH in the base polymer provides effective results for smaller molar amounts of nonionic esterifying agent relative to the molar amount of MAH. Thus, for a mole ratio of nonionic to anhydride (hereinafter also designated MRNA) within the range of 0.33 to 0.40, appreciable tack is not evident until the BuA/MAH weight ratio is at least about 3.5:1 (cf. Examples 1, 6, 12, and 14) with dramatic enhancement in all properties tested obtaining at a BuA/MAH weight ratio of about 6.5:1 (cf. Examples 1,2, and 10). Increasing the MRNA for a given base-polymer composition, within limits, likewise appears to enhance the adhesion, tack and creep properties. As is evident from Examples 13-15, the 45/25/30 polymer displays little or no adhesive utility at MRNA values of 0.133 and 0.353 respectively. However, when this value is increased to 0.797 (Example 15), adhesive properties are improved dramatically and are on the same order of magnitude as the results of Examples 1-4, which represent highly preferred embodiments of the invention. With the 65-15-20 polymer of Example 8 and repeat Example 9, however, there appears to be a pronounced loss of cohesive strength at MRNA 0.716, the reported creep results being 0.02 and 0.1 respectively. Adhesion and tack, however, are superior to Example 15. The loss of cohesive strength is perhaps best explained by reference to the effects of the plasticizing polyethoxyl-containing nonionic material. As the BuA/MAH weight ratio in the base polymer is increased, it appears that a point of diminishing returns, as regards MRNA, is encountered at progressively higher MRNA values. This is further illustrated by reference to Example 5. Here, the preferred 78/10/12 polymer having a BuA/MAH weight ratio of 6.5:1 undergoes dramatic reductions in adhesion and tack and practically total loss of cohesive strength when the MRNA is increased from 0.666 (Example 4) to 0.798. Yet the Example 15 polymer having a BuA/MAH weight ratio of 1.5:1 and an MAH content 2.5 times that of the Example 5 polymer exhibits a dramatic increase in adhesion properties using an almost identical MRNA of 0.797. Thus, increasing the amount of acrylate in the base polymer, at least partly at the expense of the MAH, correspondingly enables the use of reduced MRNA values to render the product polymer effective for adhesive use.

It should be re-emphasized, however, that the use of high MRNA values, as is necessary with the low-acrylate polymers as typified by Examples 8, 9, and 15, may provide polymers which exhibit both-edge bleed and paper backing penetration under high humidity conditions.

EXAMPLES 16 and 17

Optimum results are obtained within the parameters defined in Examples 3 and 4. These examples are repeated, scaled up into a 10-gallon reactor. Results are summarized in Table 2. The results compare favorably, particularly as regards probe tack, with Examples 3 and 4.

EXAMPLES 18-23

The effects of ethoxyl chain length of the nonionic esterifying agent on the adhesion properties of the product polymer are evaluated in these examples, the data being summarized in Table 3. The procedure is that of Examples 3 and 4, except for the indicated replacement of nonionic. The results of Examples 3 and 4 are included for purposes of comparison.

All samples were water-soluble or dispersible (Example 19) and repulpable. The locus of optimum adhesion properties appears to obtain for nonionics having about 9 moles combined ethylene oxide (Examples 3 and 4), adhesion results progressively diminishing for the most part with increased departures from the 9-mole value. However, within the 4-30-mole combined-ethylene oxide range exemplified, the polymer products have good adhesive utility. Apparently, the plasticizing effects attributable to the ethoxyl moiety become particularly manifest with the CO-880 species (30 moles combined ethylene oxide) to the detriment of cohesive strength (Examples 22 and 23). In all other aspects however, such adhesives are effective.

EXAMPLES 24 and 25

Examples 3 and 4 are repeated, replacing the CO-630 nonionic with Tergitol 15-S-5, the latter comprising $C_{11}$–$C_{15}$ linear alkanol containing 5 moles combined ethylene oxide. The results are summarized in Table 4.

TABLE 4

| Ex. No. | MRNA | Adh. Steel OZ/in | Probe Tack (g) | 160° F. Creep (hrs) | Wat. Sol | Repulpable |
|---|---|---|---|---|---|---|
| 24 | .532 | 52 | 64 | >100 | Yes | Pass |
| 25 | .666 | 52 | 87 | >100 | Yes | Pass |

Increase in the nonionic alkyl hydrophobe provides polymer adhesives having adhesion tack properties similar to those obtained in Examples 18 and 19 with CO-430 nonionic i.e., equivalent in adhesion and somewhat higher in probe tack.

EXAMPLES 26-29

Examples 3 and 4 are repeated except that stoichiometric neutralization is effected with dimethyl amine (DMA) and trimethyl amine (TMA) respectively. The results are summarized in Table 5.

TABLE 2

| Ex. No. | Polymer Sample | % Conversion | Brookfield Visc. (cps)[a] | pH 1% Sol. | Adh. Steel oz/in | Probe Tack (g) | Creep 150° F. (hr) |
|---|---|---|---|---|---|---|---|
| 16. | Ex. 3 | 97.6 | 12,750[b] | 5.1 | 78 | 252 | >100 |
| 17. | Ex. 4 | 99.0 | 8,750[c] | 5.8 | 90 | 424 | >100 |

[a] RVT #6 @ 20
[b] @ 49.8% solids
[c] @ 49.3% solids

TABLE 3

| Ex. No. | Nonionic | Moles EO | MRNA | Adh. Steel (oz/in) | Probe Tack (g) | 160° F. Creep (hrs) | Water Sol. | Repulpable |
|---|---|---|---|---|---|---|---|---|
| 18. | CO-430 | 4 | 0.532 | 54 | 38 | >100 | yes | Pass |
| 19. | CO-430 | 4 | 0.666 | 64 | 56 | >100 | * | Pass |
| 20. | CO-530 | 6 | 0.532 | 70 | 108 | >100 | yes | Pass |
| 21. | CO-530 | 6 | 0.666 | 73 | 149 | >100 | yes | Pass |
| 3. | CO-630 | 9 | 0.532 | 78 | 252 | >100 | yes | Pass |
| 4. | CO-630 | 9 | 0.666 | 90 | 424 | >100 | yes | Pass |
| 22. | CO-880 | 30 | 0.532 | 19 | 90 | 0.02 | yes | Pass |
| 23. | CO-880 | 30 | 0.666 | 44 | 85 | — | yes | Pass |

*Water Dispersible

TABLE 5

| Ex. No. | Amine | Esterified Polymer | Adh. Steel oz/in | Probe Tack (g) | 160° F. Creep (hrs) | Water Soluble | Repulpable |
|---|---|---|---|---|---|---|---|
| 26. | DMA | Ex. 3 | 70 | 562 | 0.02 | No | Fail |
| 27. | DMA | Ex. 4 | 44 | 505 | 0.02 | No | Fail |
| 28. | TMA | Ex. 3 | 52 | 668 | 0.02 | No | Fail |
| 29. | TMA | Ex. 4 | 31 | 563 | 0.02 | No | Fail |

Neutralization with amine failed to produce a water-soluble repulpable product. The adhesion values obtained were found to be somewhat higher with DMA than TMA neutralized polymer. Essentially no difference was observed in the probe tack measurement.

In comparison to that obtained with NaOH neutralization, the amine neutralized composition appears to be somewhat equivalent in adhesion to that obtained in Examples 3 and 16. The amine neutralized composition, however, was found to be significantly lower than that obtained in Examples 4 and 17. The probe tack was found to be greater than that obtained with NaOH neutralization. Apparently the discrepancies obtained between amine and NaOH neutralization are related to the degree of ionization of the carboxyl functionality.

EXAMPLES 30 and 31

The base polymer of Examples 1–5, comprising BuA/VA/MAH, 78/10/12, is prepared as described therein, but replacing the vinyl acetate (10 parts) with 10 parts styrene and 10 parts MMA respectively. The polymers were esterified with 50 php Igepal CO-630 corresponding to an MRNA of 0.532 and stoichiometrically neutralized with NaOH. The results are summarized in Table 6.

TABLE 6

| Ex. No. | Polymer | Adh. Steel (oz/in) | Probe Tack (g) | 160° F. Creep (hrs) | Water Sol. | Repulp. |
|---|---|---|---|---|---|---|
| 30 | BuA/Sty/MAH | 90 | 627 | 0.1 | Yes | Pass |
| 31 | BuA/MMA/MAH | 48 | 598 | 0.02 | Yes | Pass |

The replacement of vinyl acetate on an equal-weight basis resulted in a dramatic loss of the polymers' cohesive strength, cf, Example 16. Tack values were found to be equivalent to those obtained with the amine-neutralized series (Examples 26–29), showing perhaps a correlation between cohesive strength and tack for this polymerization, i.e., lowered cohesive strength—higher tack.

The inclusion of styrene into the polymer apparently results in an enhancement of adhesion with respect to that obtained with Examples 3 and 16. The adhesion of the methylmethacrylate-containing polymer system is seen to be somewhat inferior.

EXAMPLES 32–35

A series of 2EHA/VA/MAH-78/10/12 polymers, esterified with Igepal CO-630 and stoichiometrically neutralized with NaOH were prepared and evaluated. Monomer conversion of >97% were obtained. All samples were found to be water soluble and repulpable. Results are summarized in Table 7.

TABLE 7

| Ex. No. | MRNA | Adhesion Steel (oz/in) | Probe Tack (g) | 160° F. Creep (hrs) |
|---|---|---|---|---|
| 32 | 0.399 | 18 | 30 | 0.02 |
| 33 | 0.532 | 45 | 85 | 0.03 |
| 34 | 0.666 | 61 | 94 | 0.02 |
| 35 | 0.798 | 35 | 166 | 0.02 |

In comparison to the BuA system, it was found that the 2EHA system had a lower cohesive strength as evidenced by the 160° F. creep (shear) test, as well as lower adhesion and tack values.

Tape products prepared with the adhesive compositions of the present invention, and particularly those of Examples 16 and 17 (scale-up of Examples 3 and 4) were established to be highly effective in a wide variety of commercial applications, including the production of water-removable labels and repulpable splicing tapes for use with automatic splicing equipment. Embodiments particularly prepared herein, described in Examples 1–4, 16 and 17, are stable under high humidity conditions, exhibiting little or no roll edge bleed or penetration of the paper backing of the tape product.

The non-esterified form of the base polymers described herein, e.g., BuA/VA/MAH (78/10/12) when stoichiometrically neutralized with NaOH are essentially, if not completely, devoid of adhesion and probe tack properties, though possessing acceptable cohesive strength, water solubility and repulpability. Esterified, but non-neutralized species of the base polymer are not water soluble, and fail the repulpability test. The effects of degree of neutralization (DN) on the adhesion, tack, cohesion, solubility and repulpability characteristics of the esterified polymer are evaluated in the following examples:

EXAMPLES 36-48

BuA/VA/MAH (78/10/12) polymer is prepared as described in Examples 1-5. Post-esterification is effected with Igepal CO-630, followed by neutralization of polymer samples with NaOH to values (DN) of 0.5, 0.75 and 1.0 respectively. The results of Examples 3, 4 and 5 are included for purposes of comparison. Results for esterified but non-neutralized samples are reported as Examples 36, 40, 43 and 46. The results are summarized in Table 8.

TABLE 8

| Ex. No. | MRNA | DN | Adh. Steel oz/in | Probe Tack (g) | 160° F.* Creep | Wat. Sol. | Repulp. |
|---|---|---|---|---|---|---|---|
| 36 | .399 | 0 | 15 | — | — | No | Fail |
| 37 | | .5 | 53 | 24 | 100+ hrs | No | Fail |
| 38 | | .75 | 51 | 50 | 100+ hrs | No | Fail |
| 39 | | 1.0 | 38 | 29 | 100+ hrs | No** | Pass |
| 40 | .532 | 0 | 12 | — | — | No | Fail |
| 41 | | .5 | 77 | 208 | 2 min. | No | Fail |
| 42 | | .75 | 58 | 127 | 100+ hrs | Yes | Pass |
| 3 | | 1.0 | 57 | 106 | 100+ hrs | Yes | Pass |
| 43 | .666 | 0 | 80 | — | — | No | Fail |
| 44 | | .5 | 86 | 401 | 1 min. | No | Fail |
| 45 | | .75 | 93 | 341 | 1 min. | Yes | Pass |
| 4 | | 1.0 | 92 | 389 | 100+ hrs | Yes | Pass |
| 46 | .798 | 0 | 22 | 274 | — | No | Fail |
| 47 | | .5 | 62 | 281 | 1 min. | Yes | Pass |
| 48 | | .75 | 53 | 194 | 1 min. | Yes | Pass |
| 5 | | 1.0 | 26 | 150 | 1 min. | Yes | Pass |

*Applied stress of 500g/in²
**Water dispersible

As the results indicate, increasing the MRNA reduces the degree of neutralization (DN) required to provide a water soluble and repulpable product. Thus, at 0.399 MRNA, stoichiometric neutralization provides a water-dispersable rather than a water-soluble product, which is nevertheless repulpable. At 0.666 MRNA, a DN of about 0.75 is required. Again, cohesive strength at this relatively high DN is inferior.

The non-neutralized polymer species of Example 46 yields adhesion and tack values of 22 and 274 respectively; however, the material has low cohesive strength, is not water soluble, and fails the repulpability test. These results are similar in kind, if not in degree, to the results obtained for the dimethyl and trimethyl amine neutralized polymer species of Examples 26-29. The latter are likewise water insoluble, of low cohesive strength, and fail the repulpability test. However, probe tack results approximately double those of Example 46.

Similar results are obtained when the procedures of the foregoing examples are repeated, but utilizing other of the monomer materials hereinbefore described. The results are also equivalent where potassium and lithium hydroxide as well as the carbonate species of sodium, potassium and lithium are used in lieu of sodium hydroxide.

What is claimed is:

1. A water soluble, pressure-sensitive adhesive composition comprising the at least about 50% alkali metal neutralized, reaction product of a $C_6$-$C_{18}$ alkyl phenol or $C_6$-$C_{18}$ alkanol containing about 4 to 30 moles combined ethylene oxide with a copolymer of a monomer composition comprising by weight: from about 35 to 85% of acrylate monomer of the formula

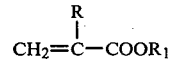

wherein R is hydrogen or lower alkyl of 1 to 4 carbons, and $R_1$ is alkyl of 1 to 14 carbons, providing that at least 60% of R is $C_4$ or greater when R is hydrogen and at least 60% of $R_1$ is $C_6$ or greater when R is $C_1$ to $C_4$ from about 8 to 30% of an $\alpha,\beta$-ethylenically unsaturated carboxylic acid anhydride and from about 8 to 30% of an auxiliary monomer selected from vinyl esters, vinyl ethers, vinyl halides, styrene, lower alkyl styrenes, lower alkyl methacrylates and $\alpha$-olefins, the weight ratio of acrylate to anhydride being from about 1.5:1 to 8:1, the amount of said alkyl phenol or alkanol being sufficient to provide an alkyl phenol or alkanol:anhydride mole ratio of about 0.3 to 0.8, and at least about 0.7 when said acrylate:anhydride weight ratio is below about 4.

2. An adhesive according to claim 1, wherein said acrylate monomer is butyl acrylate.

3. An adhesive according to claim 1, wherein said anhydride is maleic anhydride.

4. An adhesive according to claim 1, where the auxiliary monomer is vinyl acetate.

5. An adhesive according to claim 1, wherein said alkyl phenol is nonyl phenol containing about 9 moles combined ethylene oxide.

6. An adhesive according to claim 1, wherein said polymer is prepared from the polymerization of a monomer mixture comprising, by weight, 78 parts butyl acrylate, 10 parts vinyl acetate and 12 parts maleic anhydride.

7. An adhesive according to claim 6, wherein said alkyl phenol is nonyl phenol containing 9 moles combined ethylene oxide.

8. An adhesive according to claim 6, wherein said alkyl phenol or alkanol:anhydride mole ratio is from about 0.5 to 0.7.

9. An adhesive according to claim 8, wherein said alkyl phenol or alkanol:anhydride mole ratio is about 0.66.

10. An adhesive composition according to claim 1, wherein said neutralized reaction product has a degree of neutralization of 1.0.

11. An adhesive according to claim 1 where at least 60% of the acrylate monomer is $C_4$ alkyl or higher.

12. An adhesive according to claim 11 where the anhydride is maleic anyhydride, and the auxiliary monomer is vinyl acetate.

13. An adhesive according to claim 12 where the phenol is nonyl phenol containing about 9 moles of combined ethylene oxide.

14. An adhesive according to claim 12 wherein the degree of neutralizations is 1.0.

15. An adhesive tape comprising a base and a coating of a composition as defined in claim 1.

16. An adhesive tape according to claim 15 where the base is paper.

* * * * *